Oct. 22, 1963   G. L. GALLET   3,107,756
METALIZED CERAMIC MEMBERS
Filed Aug. 17, 1959

INVENTOR:
GEORGES L. GALLET,
BY Philip L. Schlamp
HIS ATTORNEY.

3,107,756
METALIZED CERAMIC MEMBERS
Georges Louis Gallet, La Celle, St. Cloud, France, assignor to Compagnie Francaise Thomson-Houston, Paris, France
Filed Aug. 17, 1959, Ser. No. 834,034
Claims priority, application France Sept. 16, 1958
12 Claims. (Cl. 189—36.5)

My invention relates to improved metalized ceramic members and improved means for effecting vacuum tight and high temperature resistant bonds between metallic and ceramic members.

In U.S. Patent No. 2,667,427 of Henry J. Nolte entitled "Method of Metalizing a Ceramic Member" and issued January 26, 1954, there is disclosed and claimed a method of providing a closely adherent metallic surface on a ceramic member. The metallic surface comprises a highly refractory metal such as molybdenum tightly held to the ceramic by a liquid layer of a manganese modified composition which is formed on the surface of the ceramic body during sintering and which serves to strengthen the bond between the refractory metal and ceramic. The refractory metal layer serves as a metallic surface to which may be bonded or brazed a metal member or the metallic surface of another metalized ceramic member. Often the bond is effected using a nickel-containing or a copper-containing brazing alloy. Also, for some applications it has been found desirable to reinforce or thicken the refractory metal layer with the deposition, as by electroplating, of a second layer of material such as nickel or copper. This layer of metal is usually more readily wettable by the brazing alloy and serves as the surface to which a metal member or another metalized ceramic member may be brazed.

I have found that during the mentioned brazing step a deterioration of the bond occurs between the refractory metal layer and the ceramic, thus adversely affecting adherence of the metalizing. This deterioration of the bond between the refractory metal layer and the ceramic results from solution of the refractory metal by the brazing alloy or wettable layer or destruction of the bond between the refractory metal particles and the ceramic substrate.

The mentioned diffusion of nickel and copper through the refractory metal layer and the adverse effects thereof also occur at the high temperatures at which some devices incorporating the described types of seals are normally operated with adverse effects on the vacuum tightness of the brazed joints.

Accordingly, the primary object of my invention is to provide improved metalized ceramic structures.

Another object of my invention is to provide improved ceramic structures including tightly adhering refractory metalized surfaces and improved means for insuring continued tight adhesion of the metal material constituting the metalized surfaces.

Another and more specific object of my invention is to provide an improved metalized ceramic structure which is adapted for resisting the deteriorating effects of nickel and copper on the strength of the bond between the metalized layer and ceramic material.

Another object of my invention is to provide improved vacuum-tight metallic bonds including improved means for insuring continued vacuum tightness thereof.

Another object of my invention is to provide improved metallic bonds effective for adapting devices incorporating same for high temperature operation.

Further objects and advantages of my invention will become apparent as the following description proceeds and the features of novelty which characterize my invention will be pointed out with particularity in the claims annexed to and forming part of this specification.

The invention itself will be best understood from the following description when taken in connection with the accompanying drawing in which.

Figure 1:
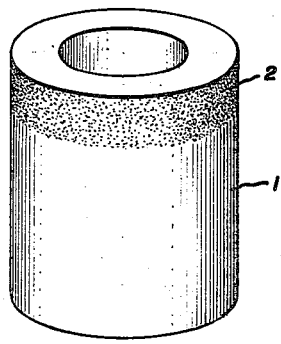
FIGURE 1 is a perspective view of a ceramic cylinder metalized at one end in accordance with one form of my invention.

Illustrated in FIGURE 1 is a ceramic member 1 prepared according to an embodiment of my invention and wherein the metalized area comprises an annular outer surface portion 2. The ceramic material can be any one of the several types widely employed in electron tube manufacture such, for example, as the forsterite and alumina ceramics.

Figure 2:
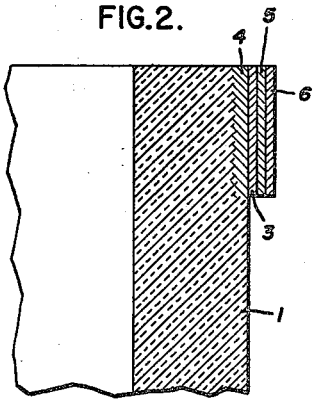
FIGURE 2 is an enlarged fragmentary sectional view of the structure of FIGURE 1.
Figure 3:
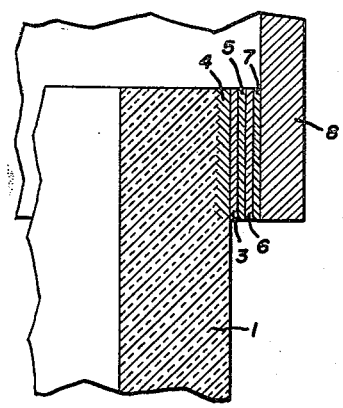
FIGURE 3 is an enlarged fragmentary sectional view illustrating a seal between a ceramic member constructed according to my invention and a metal member.

As better seen in FIGURE 2, the metalized area of the ceramic member 1 comprises a metallic layer 3 of particles of highly refractory metal which can be any one of the metals selected from the group including molybdenum, tungsten and iron but which preferably is molybdenum. The metallic layer 3 comprising the refractory metal particles can be applied to the ceramic in the manner described in the above-identified Nolte patent and is strongly adhered or bonded to the ceramic material by a manganese modified bonding composition 4 which is formed during the sintering step whereby the layer 3 is adhered to the ceramic. It will be understood that in FIGURES 3 through 5 the thicknesses of the various layers of material are illustrated exaggeratedly. In actuality these layers will be very thin, the prescribed thicknesses being set forth below.

Provided on the outer surface of the refractory metal layer 3 is a layer 5 of metal selected from the group including rhodium, platinum and iridium and alloys thereof. The layer 5 may be applied to the layer 3 in any suitable manner.

Formed over the layer 5 is a layer 6 of metal selected from the group including nickel and copper and alloys thereof. The layer 6 is provided to afford a metal surface which is readily wettable by a solder material which is shown as a layer designated 7 in FIGURE 3 and which is adapted for bonding another member such as a metal sleeve or envelope section 8 to the metalized area of the ceramic section.

The solder material 7 can be any suitable commercially available solder material and can be a nickel-containing or copper-containing brazing alloy such, for example, as nickel-gold alloys which have been found particularly effective in making the necessary brazed joint.

As indicated above, I have found that when the solder-wettable layer 6 comprises nickel or copper or any alloy containing one of these metals or when the brazing alloy contains nickel or copper, these materials tend, during the brazing process or at high operating temperatures of a device incorporating the disclosed type of seal, to diffuse through or penetrate the refractory metal layer 3 and attack or detrimentally affect the bonding material 4 between the refractory metal and the ceramic material. This diffusion or penetration is caused by the high temperature to which the materials are raised during the brazing process and especially during long brazing cycles; and the detrimental effects resulting involve the destruction of the previously accomplished tight adhesion of the layer 3. Additionally, the mentioned difficulty and undesirable effects on the adhesion on the layer 3 tend to be encountered when the seals are incorporated in devices adapted for normal operation at high temperatures. Thus, the adaptability of the device for high temperature operation is adversely affected. My invention is particularly effective in adapting devices for high temperature operation.

According to my invention the metals selected from the group including rhodium, platinum and iridium and combinations thereof constitute the layer 5. These metals have negligible solid solubility in the refractory metal constituting the layer 3.

Thus, upon heating, as during brazing, or tube operation, there is negligible mutual solution of the material of the refractory metal layer and the material of the group including rhodium, platinum and iridium. As a result, the nickel and copper are prevented from attacking or adversely affecting the bonding material between the refractory metal layer 3 and the ceramic 1.

I have found the use of molybdenum as the refractory metal layer and the use of rhodium thereon particularly effective due to the negligible low solubility of rhodium in molybdenum and the low solubility of molybdenum in rhodium. Additionally, I have found rhodium highly desirable because of its adaptability for being deposited easily by electroplating and its effectiveness in providing thereby a vacuum-tight highly adherent layer or film. Also, rhodium has a low vapor pressure which is highly desirable in materials used in electron tube manufacture.

Additionally, I have found highly satisfactory ceramic structures made according to my invention when the refractory metal layer has had a thickness between approximately 15 and approximately 50 microns, the layer 5 of rhodium has been between approximately 0.5 and approximately 2 microns and the layer 6 of nickel and copper or alloys of these materials has not exceeded 20 microns.

Figure 4:
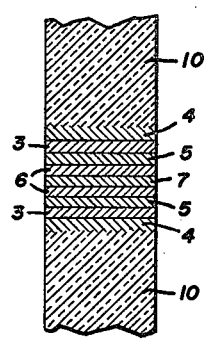
FIGURE 4 is an enlarged fragmentary sectional view illustrating a seal between a pair of ceramic members constructed according to my invention.

Illustrated in FIGURE 4 are a pair of ceramic members 10 having the abutting end surfaces thereof each metalized to include the several layers of metal described above and illustrated in FIGURE 2. The same designations are utilized in FIGURE 4 to indicate layers of material identical to those provided in the structure of FIGURE 2. The solder 7 in the structure of FIGURE 4, however, serves to join the layers 6 of both ceramic members which, in turn, are deposited on rhodium layers 5, which are deposited on the refractory metal layers 3 which are bonded by the modified manganese substance or to the members 10.

Figure 5:
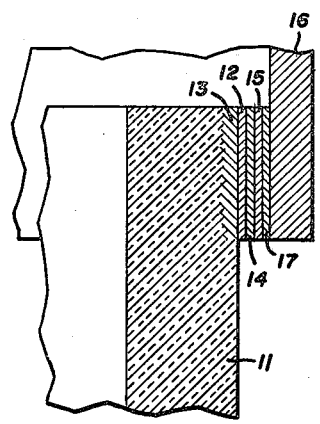
FIGURE 5 is an enlarged fragmentary sectional view illustrating a modified form of my invention.

As indicated above, it is desirable to adapt some devices for high temperature applications. Illustrated in FIGURE 5 is a seal constructed according to a form of my invention and adapted for resisting high temperatures. In this embodiment a ceramic member 11 is provided with a refractory metal layer 12 formed of one of the above-disclosed materials and preferably molybdenum. The layer 12 is bonded to the ceramic by a manganese modified substance 13 formed during sintering. Provided on the layer 12 is a film or layer 14 of material selected from the group including rhodium, platinum, iridium and combinations thereof. On the film 14 is provided a layer or film of gold 15 and used to effect a bond between the gold layer 15 and a metal section 16 is a nickel-gold eutectic brazing alloy 17. This type of joint is, because of the high brazing temperature of nickel-gold alloys above about 950° C., particularly effective for withstanding high temperatures in addition to avoiding diffusion of the nickel in the solder to the bonding material 13 which would result in detrimental effects to the adhesion of the metalized surface. Alternatively, gold-copper alloys may be employable in similar seals.

It will be understood from the foregoing that my invention is adapted for avoiding the diffusion or penetration of copper and nickel through a layer of refractory metal bonded to the surface of a ceramic member, thus to avoid detrimental effects on the bond between the refractory metal layer and the ceramic and thus on the metalization as a whole. The nickel and copper prevented from diffusing through the layer of refractory metal can originate as a solder wettable layer containing one or more of these materials provided on the surface of the refractory metal or can be contained in solder material used to effect bonds to other metal or metalized ceramic members. Additionally, the modified embodiment of my invention illustrated in FIGURE 5 is adapted for avoiding the above-described detrimental effects of the mentioned materials while also adapting a device incorporating the improved seal for higher operating temperatures.

While I have shown and described specific embodiments of my invention I do not desire my invention to be limited to the particular forms shown and described, and I intend by the appended claims to cover all modifications within the spirit and scope of my invention.

What I claim as new and desire to secure by Letters Patent of the United States is:

1. A metalized ceramic seal structure comprising a ceramic body, a metallic layer of highly refractory metal bonded to a surface portion of said ceramic body, another metallic layer bonded to said first-mentioned layer and comprising another metal which tends upon heating to diffuse through said refractory metal layer and detrimentally affect the bond between said highly refractory metal and said ceramic, and still another metallic layer comprising still another metal which has low solubility in said highly refractory metal and which is interposed between and bonded to said first- and second-mentioned metallic layers.

2. A metalized ceramic seal structure comprising a ceramic body, a metallic layer of highly refractory metal bonded to a surface portion of said ceramic body by a manganese-modified bonding composition, another metallic layer bonded to said layer of refractory metal and comprising another metal which has a tendency to affect adversely the bond between said refractory metal and said ceramic, and still another metallic layer comprising still another metal selected from the group consisting of rhodium, platinum and iridium and combinations thereof interposed between and bonded to said refractory metal layer and said first-mentioned layer of other metal to avoid diffusion of said first-mentioned other metal through said layer of refractory metal and thereby prevent adverse effects on said bond between said ceramic body and layer of highly refractory metal.

3. A metalized ceramic seal structure according to claim 1, wherein the interposed layer of metal has a thickness between approximately 0.5 and approximately 2 microns.

4. A metalized ceramic structure comprising a ceramic body, a metallic layer of highly refractory metal comprising particles of metal selected from the group consisting of molybdenum, tungsten and iron and combinations thereof bonded to a surface portion of said ceramic body, an outer metallic layer comprising metal selected from the group consisting of nickel, copper and alloys containing nickel and copper on said layer of refractory metal, and a layer of metal selected from the group consisting of rhodium, platinum and iridium and combinations thereof interposed between and bonded to said first-mentioned two layers.

5. A metalized ceramic structure according to claim 4, wherein said layer of highly refractory metal has a thickness between approximately 15 and approximately 50 microns, said outer metallic layer does not exceed approximately 20 microns, and said interposed layer of metal has a thickness between approximately 0.5 and approximately 2 microns.

6. A seal for a vacuum tube envelope comprising a pair of sections having opposed surfaces along a sealing joint, at least one of said sections being of ceramic, a metalizing layer comprising highly refractory metal particles bonded to a surface of said ceramic by a bond formed of a material which is subject to adverse effects by metals selected from the group consisting of nickel, copper, nickel-containing alloys and copper-containing alloys, a metallic layer comprising metal selected from the group consisting of nickel, copper, nickel-containing alloys and copper-containing alloys bonded between said metallizing layer and the other of said sections, and another metallic layer comprising metal selected from the group consisting of rhodium, platinum and iridium and combinations thereof interposed between and bonded to said first-mentioned two metallic layers effective for avoiding diffusion of nickel and copper through said layer of highly refractory metal, thereby to avoid adverse effects thereof on the bond between said ceramic and said refractory metal.

7. A seal according to claim 6, wherein a layer of metal comprising gold is interposed between and bonded to the metal of the group consisting of rhodium, platinum and iridium and the layer of metal of the group consisting of nickel, copper, nickel-containing alloys and copper-containing alloys.

8. A seal according to claim 6, wherein the layer of metal bonded between the first-mentioned two layers is a composite layer consisting of superposed layers of gold and a metal selected from the group consisting of rhodium, platinum and iridium.

9. A seal for a vacuum tube envelope comprising a pair of sections having opposed surfaces along a sealing joint, at least one of said sections being of ceramic, a metalizing layer of highly refractory metal comprising particles of metal selected from the group consisting of molybdenum, tungsten and iron and combinations thereof bonded to a surface of said ceramic body, a metallic layer comprising metal selected from the group consisting of nickel, copper and alloys containing nickel and copper on said refractory metal layer, a layer of metal selected from the group consisting of rhodium, platinum and iridium and combinations thereof interposed between and bonded to said first-mentioned two layers to avoid diffusion of said nickel and copper through said refractory metal layer thereby to avoid detrimental effects on the bond between said ceramic and said refractory metal, and a hard solder bond uniting the outermost of said metal layers and the other of said sections.

10. A seal for a vacuum envelope comprising a pair of sections having opposed surfaces along a sealing joint, at least one of said sections being of ceramic, a metalizing layer of highly refractory metal comprising particles of metal selected from the group consisting of molybdenum, tungsten and iron and combinations thereof bonded to a surface of said ceramic body, a layer of metal selected from the group consisting of rhodium, platinum and iridium and combinations thereof bonded to said layer of refractory metal, a layer of gold bonded to said layer selected from the group consisting of rhodium, platinum and iridium and a solder bond selected from the group consisting of nickel-gold and copper-gold alloys uniting the outermost of said metal layers and the other of said sections.

11. A metalized ceramic structure comprising a ceramic body, a layer of molybdenum bonded to a surface of said ceramic body, a layer of metal selected from the group consisting of nickel, copper and alloys containing nickel and copper bonded to said molybdenum layer, and a layer of rhodium interposed between and bonded to said two first-mentioned layers whereby diffusion of nickel and copper through said molybdenum is avoided, thereby to avoid detrimental effects of said nickel and copper on the bond between said ceramic and molybdenum.

12. A seal construction comprising a ceramic body, a metallic layer of highly refractory metal hermetically bonded to a surface portion of said ceramic body by a manganese-modified bonding composition, a metallic layer comprising another metal having a low solubility in said highly refractory metal hermetically bonded to said layer of refractory metal, and a metallic layer hermetically bonded to said second-mentioned metallic layer and comprising still another metal which tends to diffuse through said refractory metal and adversely affect said bonding composition but is prevented from doing so by said second-mentioned metallic layer.

References Cited in the file of this patent

UNITED STATES PATENTS

| | | |
|---|---|---|
| 2,053,765 | Dana | Sept. 8, 1936 |
| 2,418,460 | Buehler | Apr. 8, 1947 |
| 2,667,427 | Nolte | Jan. 26, 1954 |
| 2,667,432 | Nolte | Jan. 26, 1954 |
| 2,798,577 | La Forge | July 9, 1957 |